(12) United States Patent
Hsiao et al.

(10) Patent No.: US 8,773,607 B2
(45) Date of Patent: Jul. 8, 2014

(54) BACKLIGHT MODULE AND LIQUID CRYSTAL DISPLAY

(75) Inventors: Ken Hsiao, Guangdong (CN); Yanxue Zhang, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 390 days.

(21) Appl. No.: 13/260,257

(22) PCT Filed: Aug. 4, 2011

(86) PCT No.: PCT/CN2011/078025
§ 371 (c)(1),
(2), (4) Date: Sep. 24, 2011

(87) PCT Pub. No.: WO2013/007038
PCT Pub. Date: Jan. 17, 2013

(65) Prior Publication Data
US 2013/0010228 A1    Jan. 10, 2013

(30) Foreign Application Priority Data
Jul. 8, 2011 (CN) .......................... 2011 1 0191013

(51) Int. Cl.
*G02F 1/1333* (2006.01)
*F21V 7/04* (2006.01)
*G02F 1/1335* (2006.01)

(52) U.S. Cl.
CPC .. *G02B 6/0085* (2013.01); *G02F 2001/133628* (2013.01)
USPC .......................................................... 349/58

(58) Field of Classification Search
USPC ................................ 349/58, 60; 362/632–634
See application file for complete search history.

(56) References Cited

U.S. PATENT DOCUMENTS

| | | | |
|---|---|---|---|
| 6,055,029 A * | 4/2000 | Kurihara et al. | 349/65 |
| 6,388,722 B1 * | 5/2002 | Yoshii et al. | 349/62 |
| 6,909,475 B2 * | 6/2005 | Kojima et al. | 349/58 |
| 8,167,476 B2 * | 5/2012 | Sakamoto et al. | 362/612 |
| RE44,008 E * | 2/2013 | Sugahara et al. | 362/633 |
| 2008/0031007 A1 * | 2/2008 | Wu et al. | 362/607 |
| 2012/0281151 A1 * | 11/2012 | Abe | 348/739 |

FOREIGN PATENT DOCUMENTS

| | | |
|---|---|---|
| CN | 101004515 A | 7/2007 |
| CN | 200993712 Y | 12/2007 |
| CN | 101589267 A | 11/2009 |
| CN | 101614352 A | 12/2009 |
| CN | 101676767 A | 3/2010 |
| CN | 101943351 A | 1/2011 |
| CN | 102109131 A | 6/2011 |

OTHER PUBLICATIONS

1st Office Action of Chinese Patent Application No. 201110191013.8 issued by Chinese Patent Office.
International Search Report of the PCT Application No. PCT/CN2011/078025.

* cited by examiner

*Primary Examiner* — Mark Robinson
*Assistant Examiner* — Robert Tavlykaev

(57) ABSTRACT

The patent application relates to a backlight module and a liquid crystal display. Such backlight module includes a front casing, a back casing and a light source. The front casing includes a first clamping part and a second clamping part externally and vertically extended from the first clamping part. The second clamping part is fixedly connected with the back casing. The light source is positioned between the first clamping part and the back casing, and the back side of the light source is contacted with the inner side face of the second clamping part. The inside of the second clamping part corresponding to the back of the light source is provided with a fin heat-dissipation structure. The patent application directly fixes an LED light source on the front casing of the all-in-one machine of the liquid crystal display, which simplifies the heat transmission way, reduces the thermal contact resistance and increases the effective heat-dissipation area of the front casing Thereby, the heat caused by the LED light source can be synchronously transmitted to the front casing and to the back casing. Besides, the utility model installs a fin heat-dissipation structure on the front casing corresponding to the back of the LED light source, which can improve the heat-dissipation efficiency to a large extent. Moreover, the utility model installs a honeycomb-structured buffer component on the front casing where the liquid crystal panel is clamped for enhancing the buffering performance of the liquid crystal panel.

19 Claims, 3 Drawing Sheets

BACKLIGHT MODULE AND LIQUID CRYSTAL DISPLAY

FIELD OF THE PATENT APPLICATION

The patent application relates to the technical field of liquid crystal display, particularly to a backlight module and a liquid crystal display.

BACKGROUND

Generally, the backlight module of the existing all-in-one machine of the liquid crystal display includes a light guide plate, a light source, a back cover and a heat dissipation plate. The light guide plate is arranged on the back cover, the heat dissipation plate is arranged between the light guide plate and the back cover and the light source is arranged at the side edge of the light guide plate The circuit board of the light source of at least one side edge of the light guide plate is fixed with heat dissipating fins, and such heat dissipating fins are fixed on the back cover through an elastic component; or the heat dissipating fins are fixed on the back cover through the heat conduction glue after being bent and molded by the aluminum sheets of high thermal conductivity.

In the structure, the LED (Light Emitting Diode) Light-Bar can be selected as the light source, and the aluminum extrusion can be selected as the heat dissipating fin. Generally, the LED Light-Bar is locked onto the aluminum extrusion, and then the aluminum extrusion is assembled on the back cover for processing heat dissipation. However, such structure has the following defects.

1. Since the effective heat-dissipation area contacted between the aluminum extrusion and the back cover is smaller, the heat-dissipation effect of the backlight module would be influenced;

2. Contacts among the interfaces are existed many times during the heat-dissipation ways from the light source to the aluminum extrusion and to the back cover; as a result, the thermal contact resistance becomes larger which further influences the heat-dissipation effect of the backlight module.

SUMMARY

The main purpose of the patent application is to provide a backlight module and a liquid crystal display, which aims at improving the heat-dissipation efficiency of the backlight module of the liquid crystal display.

In order to achieve above-mentioned purpose, the patent application is directed to a backlight module, including a front casing, a back casing and a light source and a buffer component. The front casing includes a first clamping part and a second clamping part externally and vertically extended from the first clamping part. The second clamping part is fixedly connected with the back casing, the light source is positioned between the first clamping part and the back casing, and the back side of the light source is contacted with the inner side face of the second clamping part. The inside of the second clamping part corresponding to the back of the light source is provided with a fin heat-dissipation structure. The surface of the buffer component is respectively contacted with the local upper surface of the liquid crystal panel below the first clamping part and with a lateral surface.

Preferably, the backlight module further includes a light guide plate and a liquid crystal panel above the light guide plate. The light guide plate is positioned at the other side of the light source relative to the second clamping part, and the light incidence surface at the side edge of the light guide plate is arranged adjacent to the light emission surface of the light source. The light guide plate and the liquid crystal panel are all positioned between the first clamping part and the back casing. The side edge of the first clamping part which is far away from the second clamping part is internally provided with a flange for clamping the liquid crystal panel, and the bottom part of the flange is contacted with the upper surface of the liquid crystal panel.

Preferably, the middle part of the first clamping part is downwardly extended out a lug for optically coupling. The lug is downwardly extended to a space between the light source and the liquid crystal panel.

Preferably, the cross section of the buffer component is L-shaped, which is arranged into a cavity formed by the lug, the flange and the liquid crystal panel.

Preferably, the buffer component is provided with a honeycomb structure for enhancing the buffering performance of the liquid crystal panel.

Preferably, the honeycomb structure includes the following shapes such as a circle, a rectangle, a triangle or a polygon.

Preferably, the first clamping part and the second clamping part are integrally molded, and their external side surfaces constitute continuous arc-shaped surfaces.

Preferably, the light source is fixed at the inner side face of the second clamping part, and the bottom part of the light source is contacted with the back casing. The light source is an LED.

Preferably, the fin heat-dissipation structure comprises mutually-paralleled and grid-shaped through grooves, and the extending directions of the through grooves are in parallel with the upper surface of the back casing.

Further, the patent application is directed to a backlight module, including a front casing, a back casing and a light source, wherein the front casing includes a first clamping part and a second clamping part externally and vertically extended from the first clamping part; the second clamping part is fixedly connected with the back casing; the light source is positioned between the first clamping part and the back casing, and the back side of the light source is contacted with the inner side face of the second clamping part; the inside of the second clamping part corresponding to the back of the light source is provided with a fin heat-dissipation structure.

Preferably, the backlight module further including a light guide plate and a liquid crystal panel thereon. The light guide plate is positioned at the other side of the light source relative to the second clamping part, and the light incidence surface at the side edge of the light guide plate is arranged adjacent to the light emission surface of the light source. The light guide plate and the liquid crystal panel are all positioned between the first clamping part and the back casing. The side edge of the first clamping part which is far away from the second clamping part is internally provided with a flange for clamping the liquid crystal panel. The bottom part of the flange is contacted with the upper surface of the liquid crystal panel.

Preferably, the middle part of the first clamping part is downwardly extended out a lug; the lug is downwardly extended to a space between the light source and the liquid crystal panel.

Preferably, the first clamping part and the second clamping part are integrally molded, and their external side surfaces constitute continuous arc-shaped surfaces.

Preferably, the light source is fixed at the inner side face of the second clamping part, and the bottom part of the light source is contacted with the back casing, the light source is an LED.

Preferably, the fin heat-dissipation structure comprises mutually-paralleled and grid-shaped through grooves, and the extending directions of the through grooves are in parallel with the upper surface of the back casing.

Further, the patent application is directed to a liquid crystal display, including a backlight module, and the backlight module further includes a front casing, a back casing a light source. The front casing includes a first clamping part and a second clamping part externally and vertically extended from the first clamping part. The second clamping part is fixedly connected with the back casing; the light source is positioned between the first clamping part and the back casing, and the back side of the light source is contacted with the inner side face of the second clamping part. The inside of the second clamping part corresponding to the back of the light source is provided with a fin heat-dissipation structure.

Preferably, the backlight module further include a light guide plate and a liquid crystal panel thereon. The light guide plate is positioned at the other side of the light source relative to the second clamping part, and the light incidence surface at the side edge of the light guide plate is arranged adjacent to the light emission surface of the light source. The light guide plate and the liquid crystal panel are all positioned between the first clamping part and the back casing. The side edge of the first clamping part which is far away from the second clamping part is internally provided with a flange for clamping the liquid crystal panel. The bottom part of the flange is contacted with the upper surface of the liquid crystal panel.

Preferably, the middle part of the first clamping part is downwardly extended out a lug; the lug is downwardly extended to a space between the light source and the liquid crystal panel.

Preferably, the liquid crystal display further including a buffer component having an L-shaped cross section, which is arranged into a cavity formed by the lug, the flange and the liquid crystal panel. The surface of the buffer component is respectively contacted with the local upper surface of the liquid crystal panel below the first clamping part and with a lateral surface.

Preferably, the fin heat-dissipation structure includes mutually-paralleled and grid-shaped through grooves, and the extending directions of the through grooves are in parallel with the upper surface of the back casing.

A backlight module and a liquid crystal display disclosed by the patent application directly fixes an LED light source on the front casing of the all-in-one machine of the liquid crystal display, which simplifies the heat transmission way, reduces the thermal contact resistance and meanwhile increases the effective heat-dissipation area of the front casing; thereby, the heat caused by the LED light source can be synchronously transmitted to the front casing and to the back casing so that the front casing and the back casing can be radiated synchronously. Besides, the utility model installs a fin heat-dissipation structure on the front casing corresponding to the back of the LED light source, which further improves the heat-dissipation efficiency. In addition, the utility model installs a honeycomb-structured buffer component on the front casing where the liquid crystal panel is clamped for enhancing the buffering performance of the liquid crystal panel so as to improve the assembling performance of the all-in-one machine of the liquid crystal display.

The purpose implementation, the function features and advantages of the patent application will be further illustrated by integrating the exemplary embodiments and referencing the attached drawings.

DETAILED DESCRIPTION

The technical solution for realizing the purposes of the patent application would be exactly illustrated by integrating the attached drawings and the embodiments. It should be understood that the described exemplary embodiment is only used for illustrating this utility model rather than limiting.

Figure 1:
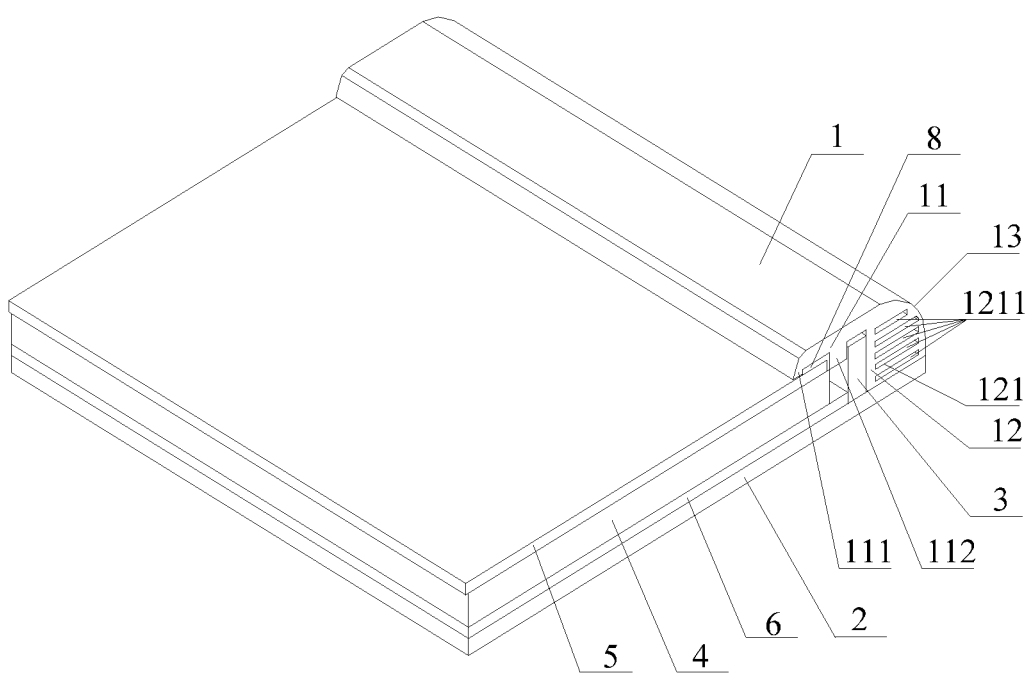
FIG. 1 shows a schematic diagram of the stereoscopic structure of the first embodiment of the backlight module according to the patent application.
Figure 2:
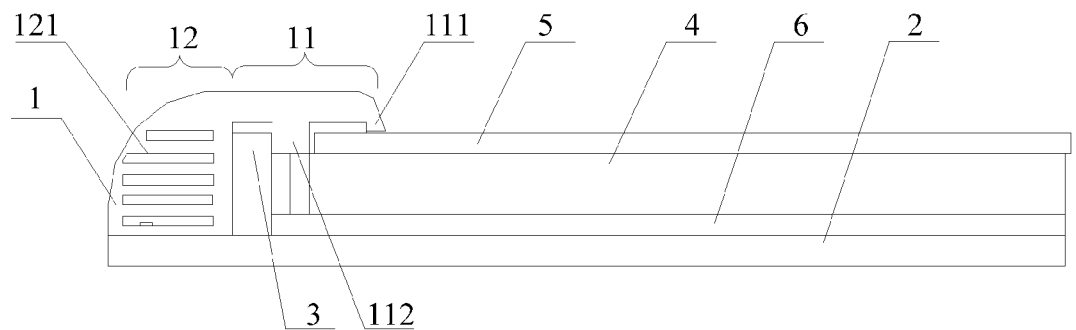
FIG. 2 shows an amplified side-view drawing of the first embodiment of the backlight module according to the patent application.
Figure 3:
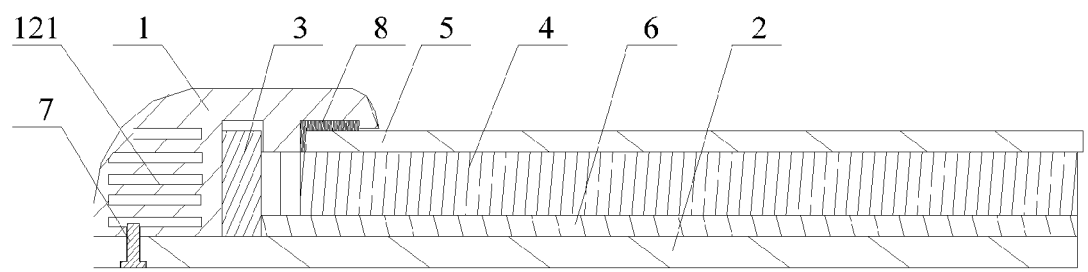
FIG. 3 shows a schematic diagram of the cross section of FIG. 2.

With reference to FIG. 1, FIG. 2 and FIG. 3, wherein FIG. 1 shows the schematic diagram of the stereoscopic structure of the first embodiment of the backlight module according to the patent application, FIG. 2 shows the amplified side-view drawing of the first embodiment of the backlight module according to the patent application, and FIG. 3 shows the schematic diagram of the cross section of FIG. 2. A backlight module provided by the first embodiment of the patent application, including a front casing 1, a back casing 2, a light source 3, a light guide plate 4, a liquid crystal panel 5 and a reflector plate 6, wherein the front casing 1 is positioned above the back casing 2 and the cross section of the front casing 1 is similarly L-shaped. The L-shaped front casing 1 includes a first clamping part 11 and a second clamping part 12, and the first clamping part 11 is in parallel with the upper surface of the back casing 2; the second clamping part 12 formed by downwardly bending from the outside of the first clamping part 11. One inner side face of the second clamping part 12 is connected with the lower surface of the first clamping part 11. The inner side face of the second clamping part 12 and the lower surface of the first clamping part 11 constitute a clamping surface for clamping the light source 3, the light source plate 4 and the liquid crystal panel 5. The inner side surface of the second clamping part 12 is vertical to the upper surface of the back casing 2, meanwhile, the bottom of the second clamping part 12 is fixedly connected with the back casing 2 through sunk screws or bolts 7.

The light guide plate 4, the liquid crystal panel 5 and the light source 3 are all positioned between the first clamping part 11 and the back casing 2. The back of the light source 3 is contacted with the inner side face of the second clamping part 12. The light guide plate 4 is positioned at the other side of the light source 3 relative to the second clamping part 12, and the light incidence surface at the side edge of the light guide plate 4 is arranged adjacent to the light emission surface of the light source 3. The liquid crystal panel 5 is positioned above the light guide plate 4. The reflector plate 6 is positioned between the light guide plate 4 and the back casing 2.

The side edge of the first clamping part 11 which is far away from the second clamping part 12 is internally and vertically provided with a flange 111 for clamping the liquid crystal panel 5, and the bottom part of the flange 111 is contacted with the upper surface of the liquid crystal panel 5.

In order to improve the head-dissipation efficiency of the liquid crystal display in this embodiment, thus the front casing 1 and the back casing 2 are made from the materials such aluminum alloy with good heat-dissipation performances. In addition, the inside of the second clamping part 12 corresponding to the back of the light source 3 is provided with a fin heat-dissipation structure 121. Such fin heat-dissipation structure 121 includes mutually-paralleled and grid-shaped through grooves 1211, and the extending directions of the through grooves 1211 are in parallel with the upper surface of the back casing 2. Surely, the through grooves 1211 can be further vertical to the upper surface of the back casing 2 and can be even extended at a certain angle on the upper surface of the back casing 2.

The light source 3 in this embodiment is fixed on the front casing 1 directly. The light source 3 can either be an LED or be an LED light bar in which pluralities of LED are packaged. If the light source is an LED, then the LED is packaged and fixed at the inner side face of the second clamping part 12 of the front casing 1; if the light source is an LED light bar, then the LED light bar is directly fixed at the inner side face of the second clamping part 12 of the second clamping part.

In the preferably embodiments, the bottom part of the light source 3 is contacted with the back casing 2 so that partial heat energy of the light source 3 can be transmitted to the back casing 2 for assisting the light source 3 to process heat dissipation.

Additionally, in this embodiment, the middle part of the first clamping part 11 is downwardly extended out a lug 112 for optically coupling and the lug 112 is downwardly extended to a space between the light source 3 and the liquid crystal panel 5. The purpose of arranging the lug 112 is to improve the optical coupling efficiency of the light source 3 and meanwhile exert a reflection effect for the light source 3 without arranging additional reflecting materials. Besides, the liquid crystal panel 5 can be better clamped through the arrangement of the lug 112.

More specifically, as is shown by FIG. 3, this embodiment installs a buffer component 8 between the front casing 1 and the liquid crystal display 5 in order to avoid the liquid crystal panel 5 being impacted and damaged due to shaking or other reasons. The buffer component 8 has an L-shaped cross section, specifically, the buffer component 8 is arranged into a cavity formed by the lug 112 at the first clamping part 11 of the front casing 1, the flange 111 and the liquid crystal panel 5. The surface of such buffer component 8 is respectively contacted with the local upper surface of the liquid crystal panel 5 below the first clamping part 11 and with a lateral surface. The buffer component 8 is able to cover the side edge of the liquid crystal panel 5 which lies in the first clamping part 11 and is able to reinforce the liquid crystal panel 5 and provide buffering for the liquid crystal panel 5. In order to improve the buffering effect, the buffer component 8 can be made from elastic materials such as rubbers etc.

Additionally, the first clamping 11 and the second clamping 12 of the front casing 1 in this embodiment can be integrally molded or be split and are then fixedly connected through screws or bolts etc.

In this embodiment, the external surfaces of the first clamping part 11 and the second clamping part constitute a continuously arc-shaped surface 13 for making the front casing 1 be an arc outline so as to enhance the aesthetic effect of the whole machine of the liquid crystal display.

The structures simplifies the heat transmission way and reduces the thermal contact resistance of the light source 3, and increases the effective heat-dissipation area of the front casing 1; thereby, the heat of the light source 3 can be synchronously transmitted by the front casing 1 and the back casing 2. A fin heat-dissipation structure 121 is arranged on the front casing 1 for improving the heat-dissipation efficiency greatly.

Figure 4:
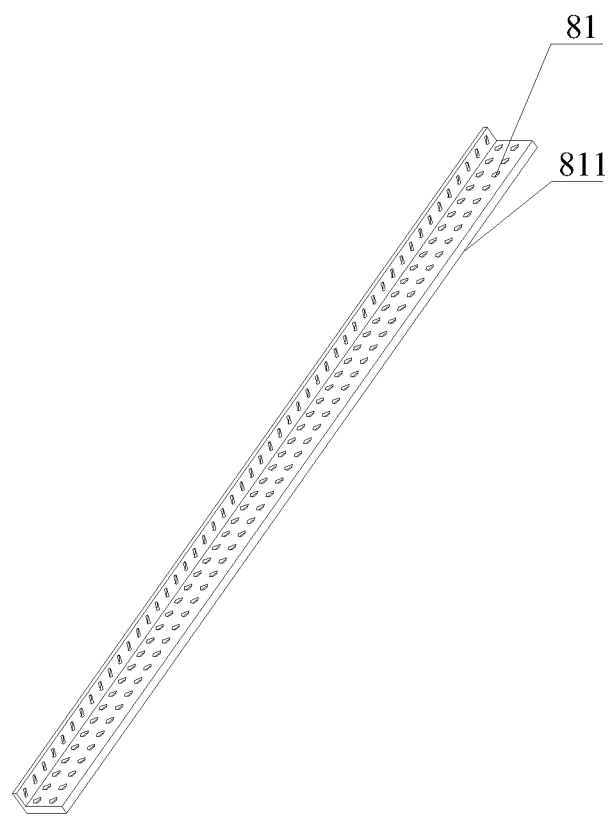
FIG. 4 shows a structural schematic diagram of the buffer component in the second embodiment of the backlight module of the patent application.

With reference to FIG. 4, the structural schematic diagram of the buffer component in the second embodiment of the backlight module of the patent application is provided. A backlight module provided by the second embodiment of the patent application is similar to that of the first embodiment, however, the difference between them lies in that the buffer component 81 in this embodiment is provided with a honeycomb structure 811 capable of further improving the buffering performance of the buffering component 8 and preventing the liquid crystal panel not being impacted and damaged. Said honeycomb structure 811 is hole-structured, and the shapes of the hole can be a circle, a rectangle, a triangle, a rhombus or other irregular polygons. The other parts of the backlight module are as same as those of the first embodiment.

In the above structures, an LED light source is directly fixed on the front casing of the all-in-one machine of the liquid crystal display, which simplifies the heat transmission way, reduces the thermal contact resistance and meanwhile increases the effective heat-dissipation area of the front casing Thereby, the heat caused by the LED light source can be synchronously transmitted to the front casing and to the back casing so that the front casing and the back casing can be radiated synchronously and the heat-dissipation efficiency can be enhanced. Besides, the utility model installs a fin heat-dissipation structure on the front casing corresponding to the back of the LED light source, which further improves the heat-dissipation efficiency. In addition, the utility model installs a buffer component 81 having a honeycomb structure 811 on the front casing where the liquid crystal panel is clamped for enhancing the buffering performance of the liquid crystal panel so as to improve the assembling performance of the all-in-one machine of the liquid crystal display.

Additionally, the patent application is directed to a liquid crystal display which includes the backlight module in the embodiments. Thus, the liquid crystal display would not be illustrated in details.

What is illustrated above is just a preferable embodiment of the patent application, which will not limit the patent scope of the patent application. Any equivalent replacements and flow changes made by the specifications and drawings of the patent application, which are directly or indirectly applied to other technical fields, should be included into the protection scope of the patent application.

What is claimed is:

1. A backlight module, comprising a front casing, a back casing, a liquid crystal panel, a light source and a buffer component; wherein the front casing comprises a first clamping part and a second clamping part extended from the first clamping part; the second clamping part is fixedly connected with the back casing; the liquid crystal panel is located between the first clamping part and the back casing, the first clamping part is located above the liquid crystal panel, the back casing is located under the first clamping part; a lug is extended from one side of the first clamping part corresponding to the liquid crystal panel; the light source is positioned between the first clamping part and the back casing, a back side of the light source is contacted with an inner side face of the second clamping part, and a front side of the light source opposite to the back side thereof is contacted with the lug; the inside of the second clamping part corresponding to the back side of the light source is provided with a fin heat-dissipation structure; the buffer component is arranged into a cavity formed by the lug, the first clamping part, and the liquid crystal panel, and a surface of the buffer component is respectively contacted with the lug, a local upper surface of the liquid crystal panel below the first clamping part and a lateral surface of the liquid crystal panel.

2. The backlight module according to claim 1, further comprising a light guide plate disposed below the liquid crystal panel; wherein the light guide plate is positioned at another side of the light source relative to the second clamping part, and a light incidence surface at the side edge of the light guide plate is arranged adjacent to the light emission surface of the light source; the light guide plate and the liquid crystal panel are all positioned between the first clamping part and the back casing; a side edge of the first clamping part which is far away from the second clamping part is internally provided with a flange for clamping the liquid crystal panel; a bottom part of the flange is contacted with the upper surface of the liquid crystal panel.

3. The backlight module according to claim 1, wherein a cross section of the buffer component is L-shaped, which is arranged into a cavity formed by the lug, the flange and the liquid crystal panel.

4. The backlight module according to claim 3, wherein the buffer component is provided with a honeycomb structure for enhancing buffering performance of the liquid crystal panel.

5. The backlight module according to claim 4, wherein the honeycomb structure comprises at least one of a circle, a rectangle, a triangle or a polygon.

6. The backlight module according to claim 1, wherein the first clamping part and the second clamping part are integrally molded, and their external side surfaces constitute continuous arc-shaped surfaces.

7. The backlight module according to claim 1, wherein the light source is fixed at the inner side face of the second clamping part, and the bottom part of the light source is contacted with the back casing; and wherein the light source is an LED.

8. The backlight module according to claim 1, wherein the fin heat-dissipation structure comprises mutually-paralleled and grid-shaped through grooves, and extending directions of the through grooves are in parallel with an upper surface of the back casing.

9. A backlight module, comprising a front casing, a back casing, a liquid crystal panel, and a light source, wherein the front casing comprises a first clamping part and a second clamping part extended from the first clamping part; the second clamping part is fixedly connected with the back casing; the liquid crystal panel is located between the first clamping part and the back casing, the first clamping part is located above the liquid crystal panel, the back casing is located under the liquid crystal panel; a lug is extended from one side of the first clamping part corresponding to the liquid crystal panel; the light source is positioned between the first clamping part and the back casing, a back side of the light source is contacted with the inner side face of the second clamping part, and a front side of the light source opposite to the back side thereof is contacted with the lug; the inside of the second clamping part corresponding to the back side of the light source is provided with a fin heat-dissipation structure.

10. The backlight module according to claim 9, further comprising a light guide plate disposed below the liquid crystal panel; wherein the light guide plate is positioned at another side of the light source relative to the second clamping part, and a light incidence surface at the side edge of the light guide plate is arranged adjacent to the light emission surface of the light source; the light guide plate and the liquid crystal panel are all positioned between the first clamping part and the back casing; a side edge of the first clamping part which is far away from the second clamping part is internally provided with a flange for clamping the liquid crystal panel; a bottom part of the flange is contacted with the upper surface of the liquid crystal panel.

11. The backlight module according to claim 10 further comprising a buffer component arranged into a cavity formed by the lug, the first clamping part and the liquid crystal panel; a surface of the buffer component is respectively contacted with the lug, a local upper surface of the liquid crystal panel below the first clamping part and a lateral surface of the liquid crystal panel.

12. The backlight module according to claim 11, wherein the buffer component has an L-shaped cross section.

13. The backlight module according to claim 9, wherein the first clamping part and the second clamping part are integrally molded, and their external side surfaces constitute continuous arc-shaped surfaces.

14. The backlight module according to claim 13, wherein the light source is fixed at the inner side face of the second clamping part, and the bottom part of the light source is contacted with the back casing; and wherein the light source is an LED.

15. The backlight module according to claim 9, wherein the fin heat-dissipation structure comprises mutually-paralleled and grid-shaped through grooves, and extending directions of the through grooves are in parallel with an upper surface of the back casing.

16. A liquid crystal display, comprising a backlight module, wherein the backlight module comprises a front casing, a back casing a light source, and a liquid crystal panel; the front casing comprises a first clamping part and a second clamping part extended from the first clamping part; the second clamping part is fixedly connected with the back casing; the liquid crystal panel is located between the first clamping part and the back casing, the first clamping part is located above the liquid crystal panel, the back casing is located under the liquid crystal panel; a lug is extended from one side of the first clamping part corresponding to the liquid crystal panel; the light source is positioned between the first clamping part and the back casing, a back side of the light source is contacted with the inner side face of the second clamping part, and a front side of the light source opposite to the back side thereof is contacted with the lug; the inside of the second clamping part corresponding to the back side of the light source is provided with a fin heat-dissipation structure.

17. The liquid crystal display according to claim 16, wherein the fin heat-dissipation structure comprises mutually-paralleled and grid-shaped through grooves, and extending directions of the through grooves are in parallel with an upper surface of the back casing.

18. The liquid crystal display according to claim 16, further comprising a light guide plate disposed below the liquid crystal panel; wherein the light guide plate is positioned at another side of the light source relative to the second clamping part, and a light incidence surface at the side edge of the light guide plate is arranged adjacent to the light emission surface of the light source; the light guide plate and the liquid crystal panel are all positioned between the first clamping part and the back casing; a side edge of the first clamping part which is far away from the second clamping part is internally provided with a flange for clamping the liquid crystal panel; a bottom part of the flange is contacted with the upper surface of the liquid crystal panel.

19. The liquid crystal display according to claim 18, further comprising a buffer component having an L-shaped cross section, which is arranged into a cavity formed by the lug, the flange and the liquid crystal panel; wherein a surface of the buffer component is respectively contacted with the lug, a local upper surface of the liquid crystal panel below the first clamping part and a lateral surface of the liquid crystal panel.

* * * * *